(12) United States Patent
Cho

(10) Patent No.: US 6,292,085 B1
(45) Date of Patent: Sep. 18, 2001

(54) MULTIPLE COIL ASSEMBLY FOR USE WITH ELECTRONIC DESCALING UNIT

(75) Inventor: Young I. Cho, Cherry Hill, NJ (US)

(73) Assignee: Electronic Descaling 2000, Inc., Boothwyn, PA (US)

( * ) Notice: Subject to any disclaimer, the term of this patent is extended or adjusted under 35 U.S.C. 154(b) by 0 days.

(21) Appl. No.: 09/289,469

(22) Filed: Apr. 9, 1999

(51) Int. Cl.[7] .................................................... H01F 5/00
(52) U.S. Cl. .................................. 336/200; 210/222
(58) Field of Search ................................. 336/200, 206, 336/232, 180; 210/222, 695

(56) References Cited

U.S. PATENT DOCUMENTS

| | | | | |
|---|---|---|---|---|
| 4,922,099 | * | 5/1990 | Masuda et al. | 250/324 |
| 5,055,189 | * | 10/1991 | Ito | 210/222 |
| 5,710,536 | * | 1/1998 | Fastman | 336/200 |
| 5,776,334 | * | 7/1998 | Cho | 210/138 |
| 5,846,414 | * | 12/1998 | Cho | 210/222 |

* cited by examiner

Primary Examiner—Lincoln Donovan
Assistant Examiner—Tuyen T. Nguyen
(74) Attorney, Agent, or Firm—Robert S. Lipton, Esq.; Lipton, Weinberger & Husick

(57) ABSTRACT

An apparatus for imparting an electric field to water travelling within a pipe. The apparatus includes a plurality of rectangularly-shaped coils of electric wire connected in an electrically parallel arrangement. Each coil is sandwiched between flexible cover sheets. The resulting assembly is applied to the outer circumference of the pipe, with the lengthwise dimension of the coil extending perpendicularly to the flow inside the pipe. A time-varying electric current is applied to the coil to produce a corresponding electric field. This, in turn, produces controlled precipitation of mineral ions from the water.

16 Claims, 5 Drawing Sheets

MULTIPLE COIL ASSEMBLY FOR USE WITH ELECTRONIC DESCALING UNIT

FIELD OF THE INVENTION

The present invention relates generally to an apparatus that reduces the formation of "scale" inside pipes or vessels which carry water or other fluids and, more particularly, the invention relates to the induction coils that are wrapped around such pipes as part of the apparatus.

BACKGROUND OF THE INVENTION

The formation of scale inside of pipes that transport water and other fluids is both a common and serious problem. This holds true for industrial as well as residential applications. The reason is that most fresh water in the United States can be regarded as "hard." Hard water contains mineral ions, such as calcium and magnesium, which are dissolved in the water but precipitate out over time onto the interior surfaces of pipes and other conduits through which the water travels.

More particularly, in scale formation, supersaturated mineral ions (such as calcium) in the water combine with counter-ions (such as bicarbonate) and then precipitate out of solution and deposit on scale-susceptible surfaces.

As scale deposits on the inside surface of the pipe accumulate, the effective diameter of the pipe is reduced, thereby restricting the flow of water. (In a vessel for holding water, scale reduces the vessel's capacity.) This is an especially acute problem when the water is used in a heat transfer situation such as a boiler. Since the scale deposits act as a heat insulator, it contributes to the further deleterious effect of reducing the efficiency of the heat transfer. This reduction can be very expensive, causing as much as 70% of the overall cost of the heating fuel to be wasted.

One way of dealing with scale deposits is to physically remove the deposits by such procedures as sand blasting, acid cleaning, mechanical scraping or brush punching. However, these procedures generally require at least some disassembly of the equipment in which the scale deposits have formed, with consequent interruption in the operation of that equipment, in addition to the cost of the procedures themselves. Moreover, these physical methods of removing the scale may damage the pipe or other pieces of equipment. Furthermore, certain sections of pipe may be inaccessible to a scraper or brush, making it impossible to remove the scale with a physical procedure.

Procedures using physically non-invasive steps are known in the art. For example, it is known to wrap a wire in an elongated, spiral configuration around a segment of the pipe, upstream from the location where the scale deposits would normally form. The spirally-wrapped wire forms an induction coil. A time-varying electric current is passed through the coil, thereby creating a time-varying magnetic field inside the segment of pipe around which the wire is wrapped. That magnetic field produces induction and this induction in turn causes the mineral ions to precipitate out of the water. This effect by an electronic descaling apparatus is called "controlled precipitation".

Calcium carbonate precipitates are capable of assuming two predominant crystal structures. One of these crystal structures floats in solution and can be carried away by the water flow; the other crystal structure tends to cling to the lateral pipe surfaces and/or to sink to the bottom and hence accumulates to form the undesired deposits.

It is a goal in controlled precipitation to promote the first crystal structure which floats in the water. This is achieved by forming, upstream of the region of the potential scale deposits, seed crystals of the above-described structure which float in solution. These seed crystals cause subsequent mineral carbonate precipitates of the same structure to grow around them. These precipitates then pass through the (downstream) region of potential scale deposits without causing the (undesired) formation of such deposits.

As previously noted, a known technique for effecting controlled precipitation involves spirally wrapping an induction coil around the above-mentioned upstream portion of the pipe and energizing this coil with a time-varying electric current. This current in the induction coil creates a time-varying magnetic field inside the pipe and that field, in turn, causes induction which then in turn produces the desired controlled precipitation.

This known technique is relatively effective in dealing with undesired scale formation, but there are situations in which its implementation is problematic. For example, there are installations in which the diameter of the piping around which the induction coil would need to be wound is so large (as much as 84 inches in some electric power generating plants) that it would be impractical to wrap the required induction coil around the perimeter of the pipe due to its physical size and the large impedance created by the long length of wire needed to form a large diameter coil.

As another example, there are installations in which the piping is in such tight quarters, or so close to other equipment, that it would again be impractical to wrap the induction coil around the outer perimeter. Also, the larger the diameter of the pipe, the greater the electric current that is needed to effect the precipitation of the calcium carbonate.

SUMMARY OF THE INVENTION

The present invention comprises a plurality of individual induction coils that are connected together in an electrical parallel connection. Each coil is comprised of a length of flat wire attached to a correspondingly flat support surface, such as a flexible sheet of plastic or nonferrous metal. To protect the flat wire from damage, it is preferably overlaid with another such flexible sheet.

The flat wire is formed in a substantially planar, spiral-like configuration. The turns of the spiral-like configuration are preferably not round, but are elongated in the same general direction, so as to form a coil of a generally rectangular shape, with a wire-free central portion extending lengthwise of the rectangle.

Thus, there is created a rectangular sandwich-like assembly of spiral-like, flat wire, flanked by cover sheets. This assembly is relatively thin (preferably only fractions of an inch in thickness). It is also flexible, since both the wires and their cover sheets are chosen so as to be inherently flexible.

Each individual coil is arranged so that the short side of one rectangularly-shaped coil overlays the short side of its immediately adjacent rectangularly-shaped coil. This forms a flat, elongated rectangular coil assembly which is rolled around the perimeter of the pipe segment in which the desired controlled precipitation is to be achieved. The longitudinal direction of each wrapped rectangular coil is substantially concentric with the wall of the pipe. An axis through the center of each rectangularly-shaped coil would intersect and be substantially perpendicular to the longitudinal axis of the pipe.

In so doing, the coil assembly is positioned so that its lengthwise dimension extends circumferentially with respect to the pipe.

When the coil assembly is energized by a time-varying electric current, an oscillating electric field is created through which the water flows. The oscillating electric field causes the desired controlled precipitation of calcium carbonate out of the water that flows through the pipe section around which the coil assembly is wrapped. The oscillating electric field also tends to promote the formation of the calcium crystal structure that floats in water rather than the crystal structure that accumulates.

Although the preferred embodiment utilizes three coils, additional flat, rectangularly-shaped coils in accordance with this invention can be added to work as intended with large-diameter pipes. By virtue of its thinness and inherent flexibility, it can readily be applied to pipes in restricted locations. When so applied, it can be held in place either by adhesive on the exposed surface of one of the plastic sheets, or by ordinary cable ties or other clamps surrounding the sandwich-like structure and any portions of the pipe circumference not covered by the sandwich-like structure.

BRIEF DESCRIPTION OF THE DRAWINGS

The foregoing summary, as well as the following detailed description may be better understood when read in conjunction with the accompanying drawings, which are incorporated in and form a part of the specification. The drawings serve to explain the principles of the invention and illustrate embodiments of the present invention that are preferred at the time the application was filed. It should be understood, however, that the invention is not limited to the precise arrangements and instrumentalities shown.

In the accompanying drawings.

The same reference numerals are used in the several figures to designate corresponding elements.

DETAILED DESCRIPTION OF THE PREFERRED EMBODIMENTS

In describing a preferred embodiment of the invention, specific terminology will be selected for the sake of clarity. However, the invention is not intended to be limited to the specific terms so selected, and it is to be understood that each specific term includes all technical equivalents that operate in a similar manner to accomplish a similar purpose. Unless otherwise specified, the words "inwardly" and "outwardly" refer to radial directions toward and away from, respectively, the geometric center of a continuous pipe section to which the present invention is applied. The term "spiral-like" refers to a flat, two-dimensional configuration (in its initial shape since the two-dimensional configuration may be bent or wrapped around the exterior of the pipe).

Preferred embodiments of the present invention will now be described in detail with reference to the accompanying drawings in which a plurality of pre-wrapped coils connected in parallel, in accordance with the present invention, is generally indicated at 10.

Figure 1:
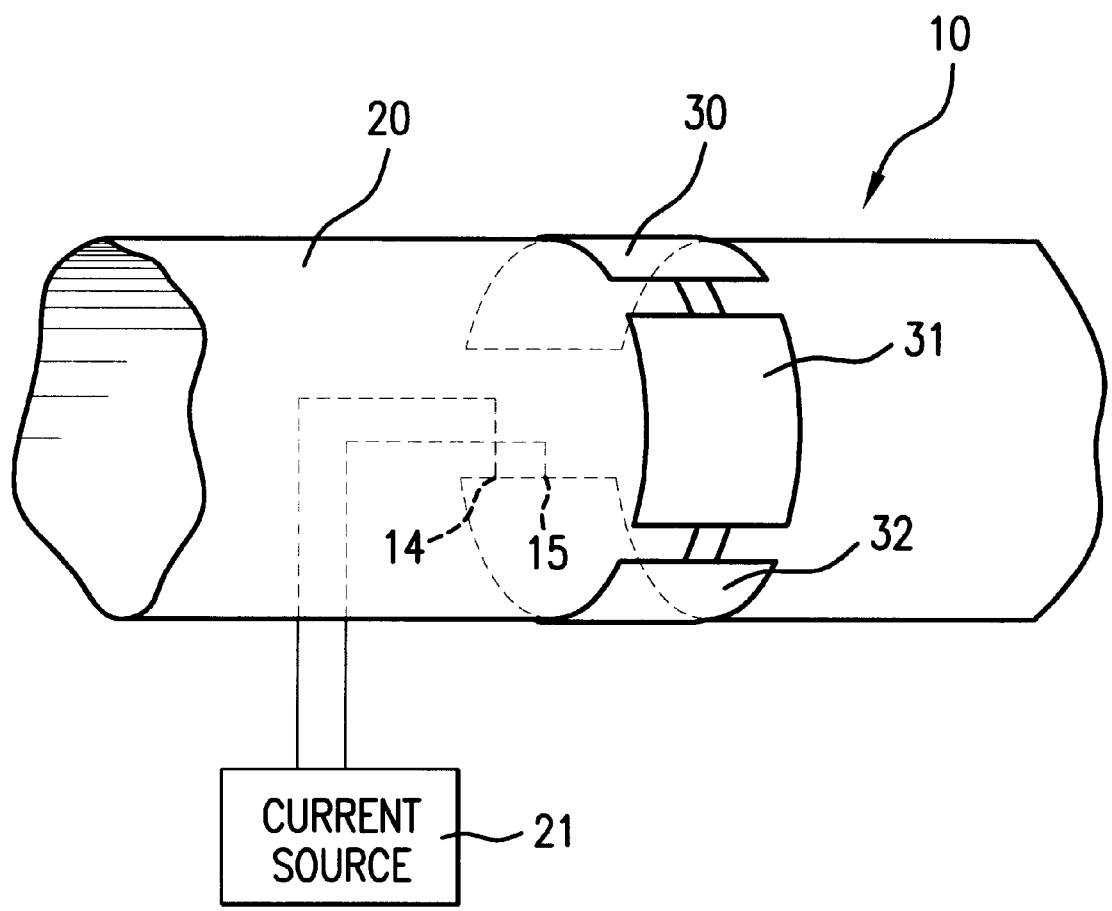
FIG. 1 is a perspective view of a plurality of pre-wrapped, rectangularly-shaped coils in accordance with the present invention wrapped around a pipe section.

Referring now to FIG. 1, a preferred embodiment of a pre-wrapped coil assembly 10 is comprised of three, individual rectangularly-shaped coils 30, 31 and 32 that are connected together and wrapped around a pipe segment 20. Electrical connections between the three coils 30, 31 and 32 are made with electrical wires and brought to terminations 14 and 15. These terminations provide a means for connecting the coil assembly 10 to a current source 21. The current source provides electrical current to each of the individual coils 30, 31 and 32 for producing an electric field in the pipe segment around which the coil assembly 10 is wrapped. As the water travels through pipe segment 20, it is subjected to the electrical field.

Figure 2:
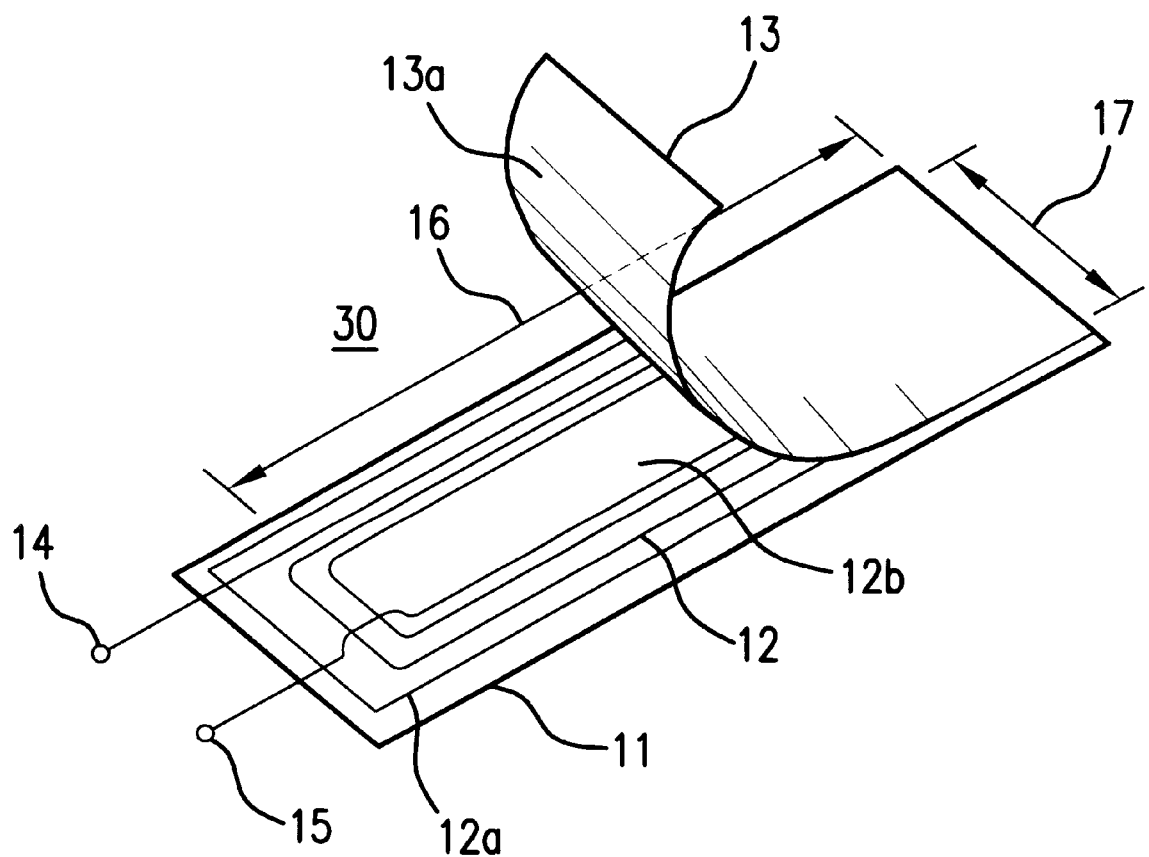
FIG. 2 is a top view of one of the rectangularly-shaped coils shown in FIG. 1 laid flat and illustrating its sandwich-like structure.

As shown in FIG. 2, an individual coil 30 comprises a sandwich-like assembly of a support sheet 11, flat wire 12 formed into a spiral-like shape, and cover sheet 13. Coils 31 and 32 are substantially identical to coil 30. However, as discussed below, each coil 30, 31 and 32 may have different dimensions depending on the specific application.

In FIG. 2, the cover sheet 13 has been shown partially peeled back in order to provide a clearer picture of the sandwich-like construction of a single coil 30. In an actual finished assembly, this cover sheet 13 overlies flat wire 12 and support sheet 11.

A sandwich-like assembly of flat wire 12 flanked by support sheet 11 and cover sheet 13 is formed by gluing the sheets together. The face of the support sheet 11 is coated with epoxy glue; the flat wire 12 is pre-shaped into its spiral-like configuration and placed on the top face of the support sheet 11. Epoxy glue is spread on the bottom face 13a of the cover sheet 13. Finally, the cover sheet 13 is placed over the flat wire 12 and support sheet 11.

Flat wire 12 is preferably attached to support sheet 11 by an epoxy glue. Flat wire 12 is attached to cover sheet 13 by having the latter's face 13a coated with adhesive. Alternatively, a double-sided tape 12a underlying the coil may be used to secure the wire 12 to support sheet 11. Adhesive tape 12a should have surface dimensions slightly greater than those of the spiral-like, flat wire 12, but smaller than the surface dimensions of the respective support and cover sheets 11 and 13.

The two ends of flat wire 12 are brought out to terminals 14 and 15 for connection to the electrical circuitry 21 which provides electric current and is used to energize each coil 30, 31 and 32.

Wire 12 is made from an electrically conducting metal (preferably copper or aluminum) that has been flattened on diametrically opposite sides to reduce the overall thickness of the coil 30. In addition to being flat, wire 12 is preferably insulated to prevent shorting between adjacent turns of the coil, and also to enable the innermost end of the flat wire to be brought out to terminal 15 across the other turns of the spiral-like flat wire 12.

The wire 12 of which coil 30 is made preferably of the stranded variety, rather than solid core. This is so that the wire 12 will be relatively flexible, both in order to form the desired bends at the four corners of the rectangular coil, and to facilitate flexing of the entire assembly 10 when being applied to a pipe in accordance with the invention.

As can be seen from FIG. 2, the coil 30 has a generally rectangular configuration, with a long dimension (or length) 16 and a short dimension (or width) 17. The corners of the flat wire 12 are somewhat rounded, consistent with the bending characteristics of the electrical wire 12. As can be seen in FIG. 2, a wire-free space 12b preferably extends lengthwise of flat wire 12 between the legs of the innermost turn of the flat wire 12.

It will be understood that the number of turns and the specific geometry of spiral-like flat wire 12, shown in FIG. 2, are purely illustrative. In a practical embodiment, there may be many more turns, and they may be much closer to each other than shown in FIG. 2. Indeed, adjacent turns may touch each other, the wire being insulated as noted above. Also, alternate configurations including circles, ovals and other shapes (geometric or otherwise) may be utilized depending on the specific application or environment.

Successful embodiments of the sandwich-like coils 30, 31 and 32 embodying the present invention have been constructed with the following preferred parameters for the flat wire 12 (See FIG. 2):

| | |
|---|---|
| Length 16 | 19 inches |
| Width 17 | 12 inches |
| Number of turns | 25 |
| Wire size | 14 gauge |
| Width of tape 12a | 4 inches |

It will be understood that still other variations will occur to those skilled in the art, without departing from the inventive concept.

Figure 3A:
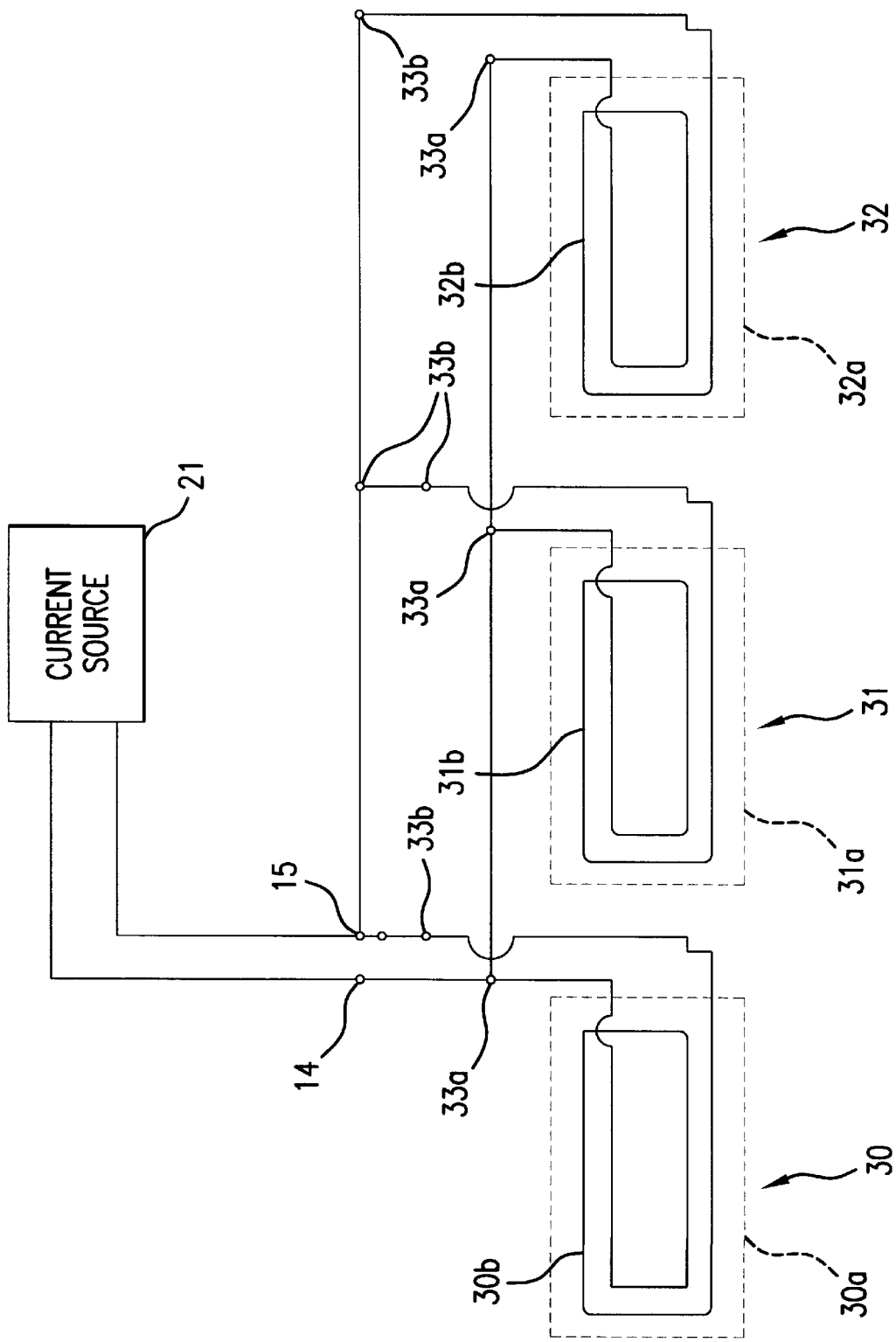
FIG. 3A is a block diagram of the pre-wrapped, rectangularly-shaped coils shown in FIG. 1 connected in parallel to an electronic descaling unit.

Turning now to FIG. 3A, this shows, in a simplified diagrammatic form, the electrical connections of coils 30, 31 and 32 in accordance with the invention. (Note that the coils 30, 31, and 32 together form the pre-wrapped coil assembly 10.) Specifically, broken-line rectangles 30a, 31a and 32a respectively represent the flat rectangular outlines of coils 30, 31 and 32.

The sandwich-like coils 30, 31 and 32 are oriented in the same direction (i.e., in the same longitudinal alignment) and the corresponding terminations 33a, 33b from each coil are connected in an electrically parallel connection. The terminations 33a, 33b are eventually connected to a single pair of terminals 14, 15 which provide an input to the pre-wrapped coil assembly 10 from the current source 21. If additional coils are added, they will be aligned in the same longitudinal direction as the preceding coils 30, 31 and 32. This ensures that the electric field generated by each coil is concentrated in the same direction.

Wires 30b, 31b and 32b are schematic diagrams of the flat coils 30, 31 and 32, respectively. In FIG. 3A, only two turns are shown for each coil, but it will be understood that this is for explanation only. As indicated previously, twenty-five (25) turns are used in a preferred embodiment.

Figure 3B:
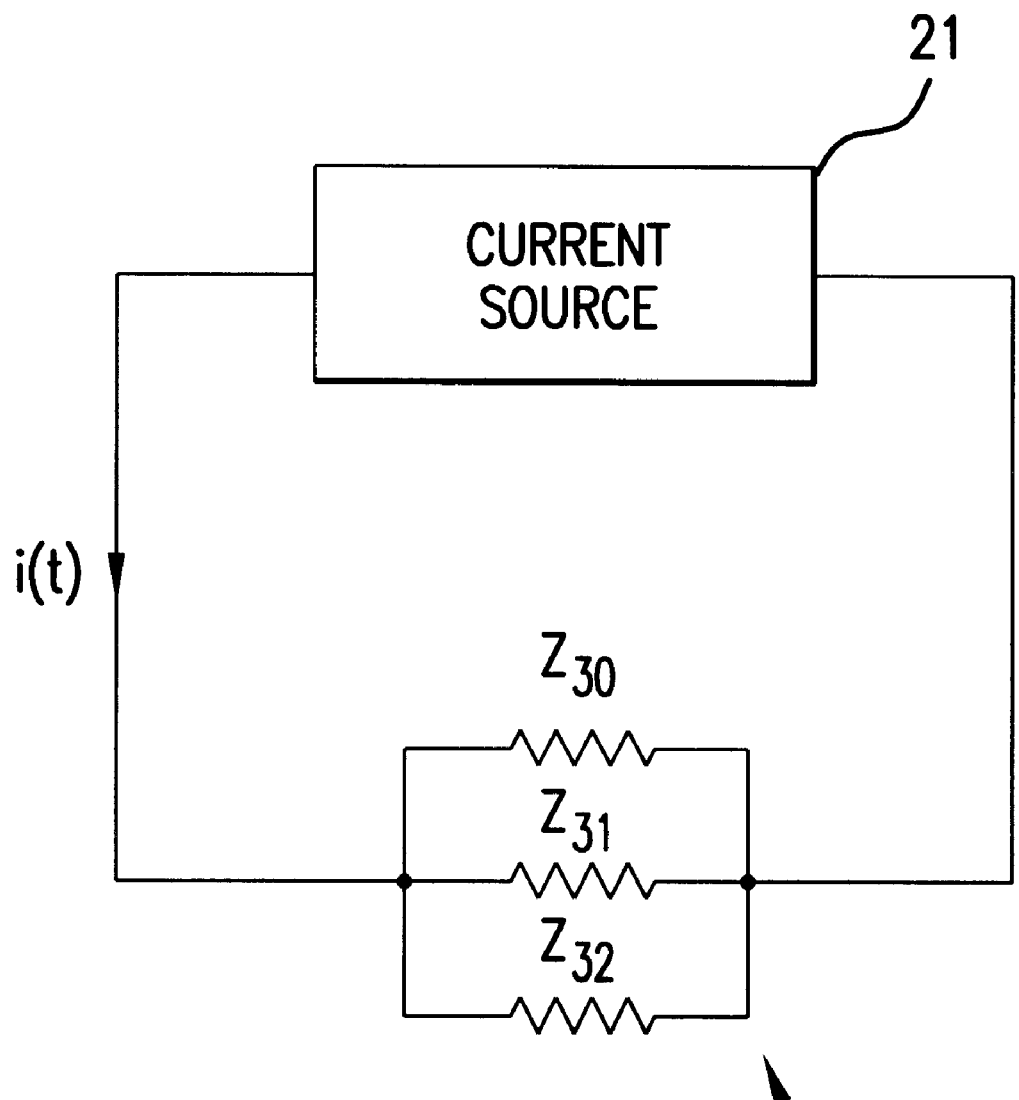
FIG. 3B is a schematic diagram of the pre-wrapped, rectangularly-shaped coils shown in parallel in FIG. 3A connected to an electronic descaling unit.

FIG. 3B is a block diagram of the coils illustrated in FIG. 3A. As shown, each coil is represented by its respective impedance, $Z_{30}$, $Z_{31}$, and $Z_{32}$. Since the coils are connected in parallel, the overall impedance decreases, thus producing a strong electric field in the water when the coils are wrapped around the perimeter of the pipe (i.e., $1/Z_T = 1/Z_{30} + 1/Z_{31} + 1/Z_{32}$). In the preferred embodiment, when the coils are standardized (i.e., the same length and width, number of turns, same gauge of wire, etc.,) the impedance of one coil substantially equals the impedance of the other coils ($Z_{30} = Z_{31} = Z_{32}$).

Figure 4A:
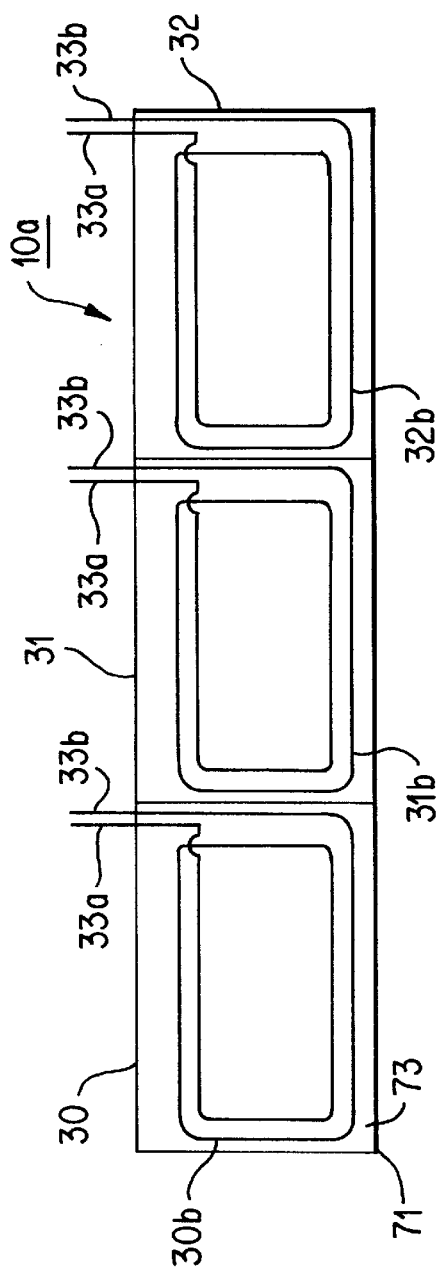
FIG. 4A is a top view of one embodiment of the rectangularly-shaped coils shown in FIG. 1 laid flat.

Referring now to FIG. 4a, one embodiment of the physical structure of the coil assembly 10 is illustrated. Coils 30, 31 and 32 are manufactured as individual units. A short side of coil 30 is abutted against the opposite short side of coil 31; the remaining short side of coil 31 is abutted against the opposite short side of coil 32. As illustrated, each coil is aligned in the same longitudinal direction, i.e., the wires of all coils are wound in the same direction (and preferably with the same number of turns) so that their output terminations 33a, 33b are all on the same side.

Figure 4B:
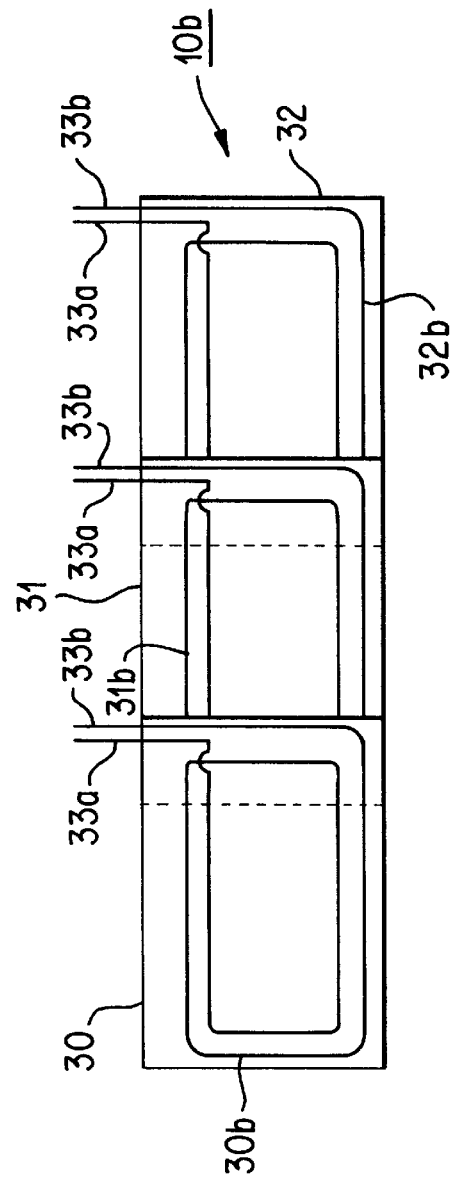
FIG. 4B is a top view of an alternate embodiment of the rectangularly-shaped coils shown in FIG. 1 laid flat, but with overlapping ends.

FIG. 4b shows an alternate embodiment wherein a portion of each coil overlaps each adjacent coil. In the example shown, and in keeping with the proper alignment, the left portion of coil 31 overlaps the right portion of coil 30; similarly, the left portion of coil 32 overlaps the right portion of coil 31. Although, the order of overlap is not important, the alignment of each coil is important.

The coils of FIG. 4b may also be individually pre-manufactured. However, due to manufacturing costs or other reasons, it is possible to manufacture the coil assemblies 10a, 10b of FIGS. 4A and 4B, respectively, as a single unit. Specifically, turning to FIG. 4A, all three flat wires 30b, 31b, and 32b may be placed on a single support sheet 71. Support sheet 71 will have the same width as support sheet 11 that is used to manufacture a single coil 30, but will be approximately three times longer. Similarly, a single cover sheet 73 may be substituted for three individual cover sheets 13.

Referring again to FIG. 1, the coil assembly 10 is placed around the outside of pipe segment 20. This pipe segment 20 contains and directs the water whose scale forming effect is to be treated in accordance with the present invention. Since each coil has the same general construction, and each is attached to the circumference of pipe 20 in the same manner, the coils should have the same orientation as shown in FIG. 3A, namely with their lengthwise dimension is perpendicular to the flow of water in pipe segment 20.

As shown in FIG. 1, the coil assembly 10 preferably surrounds most of the circumference of pipe segment 20. Indeed, the opposite ends of coil assembly 10 may actually touch, or even overlap. In fact, it is preferred that the flat wires of coil 30 overlap the flat wire of coil 32. This would increase the over-all effectiveness of the induction created by the electric field in producing controlled precipitation within pipe segment 20.

In FIG. 1, terminals 14 and 15 are shown connected to electric current source 21. This source 21 represents the circuitry which energizes the coil 12 to produce controlled precipitation inside pipe 20. The characteristics and operation of circuitry suitable for this purpose are known and are, therefore, not further discussed herein. For example, reference is made in this regard to co-pending U.S. patent application Ser. No. 08/544,156, filed Oct. 17, 1995, which issued into U.S. Pat. No. 5,725,778, on Mar. 10, 1998; U.S. patent application Ser. No. 08/544,026, filed Oct. 17, 1995 which issued into U.S. Pat. No. 5,670,041 on Sep. 23, 1997; and U.S. patent application No. 08/736,230, which issued into U.S. Pat. No. 5,776,334 on Jul. 7, 1998. All of the aforementioned applications are assigned to the assignee of the present invention. Each of the aforementioned three applications disclose details of circuitry suitable for use as current source 21 in FIGS. 1 and 3; their contents are incorporated in the present specification by reference, as if fully set forth at length herein.

As previously noted, the assembly 10 may be secured to pipe 20 by adhesive (not visible in FIG. 1) on the surface of support sheet 71 which faces away from coil 12 and toward the pipe segment 20. It is this adhesive surface on the support sheet 71 by means of which assembly 10 is then retained against pipe 20.

As previously mentioned, if adhesive attachment of the assembly to the pipe is not appropriate, mechanical attachment can be used, as by wrapping so-called cable ties around the outside of the one or more assemblies. This would be especially appropriate if there is very little space between the pipe to be equipped with an assembly embodying the invention and adjacent equipment. In that case, the assembly may have to be slid into position through a narrow gap, and adhesive on the side facing the pipe could interfere with that sliding movement.

Coils 30, 31 and 32 are preferably so dimensioned that, when applied to pipe segment 20, they combine to encircle most of the circumference of the pipe. Preferably, the three separate coils 30, 31 and 32 have the same external and internal constructions and dimensions and are positioned symmetrically around the circumference of pipe 20.

Referring again to FIGS. 1 and 3A, the opposite ends of coil assembly 10 are shown separated by an appreciable distance. However, this showing is only to enable clear illustration of the external connections to coil assembly 10, including terminals 14 and 15. In actuality, these opposite ends of assembly 10 are preferably brought as close as practical to each other. There may even be a slight overlap of each coil end, as discussed previously.

In the preferred embodiment of the invention, the length of each coil is substantially equal (i.e., approximately 1/3 the perimeter of the pipe 20). However, for a specific application, one individual coil may have a length different than that of the other two coils. In fact, all three coils may have different lengths.

Since pipes come in standardized diameters, it may be desirable to standardize the length of each coil in order to reduce manufacturing costs. For example, a standard length of nineteen inches for each individual coil may be used. When affixed to a sixteen-inch diameter pipe, three nineteen-inch long coils can be utilized (taking into account the overlap portion), while four coils can be used for a twenty inch pipe.

Referring again to FIG. 3A, the time-varying electric current provided by source 21 to terminals 14, 15 circulates simultaneously in one direction (e.g., clockwise then counter-clockwise, clockwise, etc.) in each coil 30b, 31b and 32b (as noted previously the flat wire in each coil is wrapped in the same direction). As a result, when coils 30, 31 and 32 are attached to pipe segment 20 as shown in FIG. 1, the electric fields created inside pipe 20 by the three coils will have the same orientation with respect to the interior of the pipe and their effects will therefore reinforce each other.

More than three separate coils like those in FIG. 2 can be placed around the pipe circumference. All coils should then be interconnected so that the current in all of them circulates in the same direction, and therefore produces electric fields of the same orientation with respect to the interior of the pipe.

Although this invention has been described and illustrated by reference to specific embodiments, it will be apparent to those skilled in the art that various changes and modifications may be made which clearly fall within the scope of this invention. The present invention is intended to be protected broadly within the spirit and scope of the appended claims.

What is claimed is:

1. A coil assembly for use in reducing scale formation inside a pipe having an outer surface and adapted to contain flowing liquids, said coil assembly comprising:

a plurality of spiral-like coils each having a generally rectangular shape, each coil formed from a length of wire having opposite ends, each end of each coil being connected electrically in parallel to each other and are connected to an electric power source;

said coils, when placed on a flat surface, having a longitudinal axis equidistant between the two sides of the rectangle having the greater length and the two sides having the shorter sides forming two ends; and at least 3 of said coils each being secured to the outer surface of said pipe so that said coils are physically aligned in series end to end so that their longitudinal axis are substantially perpendicular to the direction of the liquid flowing through the pipe.

2. The apparatus of claim 1, wherein said coil assembly is sufficiently flexible thereby permitting it to be conformed to the outer circumference of a pipe section.

3. The apparatus of claim 1 wherein said coils have rounded corners.

4. The apparatus of claim 1 wherein the length of said coil assembly does not exceed the circumference of the outer surface of the pipe.

5. The apparatus of claim 1 wherein each of said coils are pre-wrapped.

6. The apparatus of claim 1 wherein the plurality of coil assemblies are assembled such that the coils of wire are electrically connected such that current is able to flow through the coils of wire in the same direction for each coil so that an electric field within the pipe produced by one coil of wire is reinforced by the electric field of the other coils of wire.

7. The apparatus of claim 1 wherein said wire is flat.

8. The apparatus of claim 1 wherein said shorter ends, abut or overlap.

9. A coil assembly for use in reducing scale formation inside a pipe having an outer surface and adapted to contain flowing liquids, said coil assembly comprising:

a plurality of spiral-like coils each having a generally rectangular shape, each coil formed from a length of wire having opposite ends, each end of each coil being adapted to be connected electrically in parallel to each other and are connected to an electric power source;

said coils, when placed on a flat surface, having a longitudinal axis equidistant between the two sides of the rectangle having the greater length and the two sides having the shorter sides forming two ends; and at least 3 of said coils each being adapted to be secured to the outer surface of said pipe so that said coils are physically aligned in series end to end so that their longitudinal axis are substantially perpendicular to the direction of the liquid flowing through the pipe.

10. The apparatus of claim 9, wherein said coil assembly is sufficiently flexible thereby permitting it to be conformed to the outer circumference of a pipe section.

11. The apparatus of claim 9 wherein said coils have rounded corners.

12. The apparatus of claim 9 wherein the length of said coil assembly does not exceed the circumference of the outer surface of the pipe.

13. The apparatus of claim 9 wherein each of said coils are pre-wrapped.

14. The apparatus of claim 9 wherein the plurality of coil assemblies are assembled such that the coils of wire are electrically connected such that current is able to flow through the coils of wire in the same direction for each coil so that an electric field within the pipe produced by one coil of wire is reinforced by the electric field of the other coils of wire.

15. The apparatus of claim 9 wherein said wire is flat.

16. The apparatus of claim 9 wherein said shorter ends, abut or overlap.

* * * * *